United States Patent

McCarthy

[11] 4,052,925

[45] Oct. 11, 1977

[54] EXPANSION STUD

[75] Inventor: Edward P. McCarthy, York, Pa.

[73] Assignee: U.S. Expansion Bolt Company, York, Pa.

[21] Appl. No.: 629,050

[22] Filed: Nov. 5, 1975

[51] Int. Cl.² .................................. F16B 13/06
[52] U.S. Cl. ................................ 85/77; 85/72; 85/88
[58] Field of Search ............... 85/79, 72, 85, 83, 84, 85/77, 78, 88

[56] References Cited

U.S. PATENT DOCUMENTS

| 1,265,866 | 5/1918 | Ackerman | 85/77 X |
| 1,495,497 | 5/1924 | Ogden | 85/88 |
| 3,352,193 | 11/1967 | Lerich | 85/79 |
| 3,448,651 | 6/1969 | Passer | 85/72 |
| 3,709,089 | 1/1973 | Seetaram | 85/85 X |
| 3,750,526 | 8/1973 | Lerich | 85/79 |
| 3,766,819 | 10/1973 | Giannuzzi | 85/77 |

FOREIGN PATENT DOCUMENTS 227,800  3/1969  U.S.S.R. .................. 85/79

Primary Examiner—Ramon S. Britts
Attorney, Agent, or Firm—Stoll and Stoll

[57] ABSTRACT

An expansion stud for use in a blind bore hole or the like formed in a concrete anchorage or like support, wherein an expansion sleeve is caused to expand radially in perpendicular relation to the longitudinal axis of the expansion stud and to the bore hole wall. The stud is provided at its inner end with a conically tapered wedge tip formation whose smaller end is integral with the main body of the stud. The expansion sleeve is provided with an internal conically tapered bore which corresponds to the conical taper of the wedge tip, such that axial outward movement of the stud relative to the expansion sleeve causes radial expansion thereof perpendicular to the stud axis and the bore hole wall.

8 Claims, 21 Drawing Figures

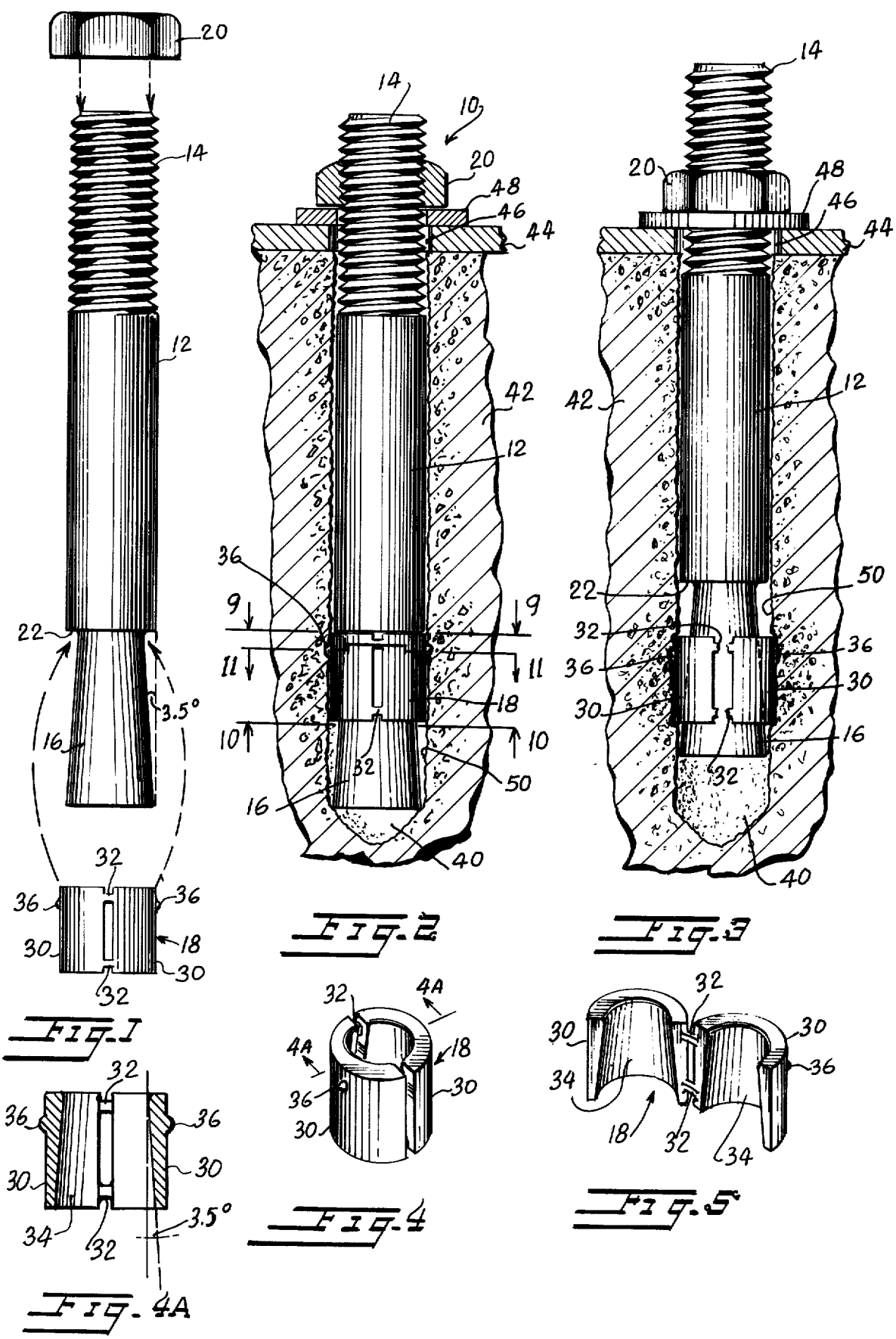

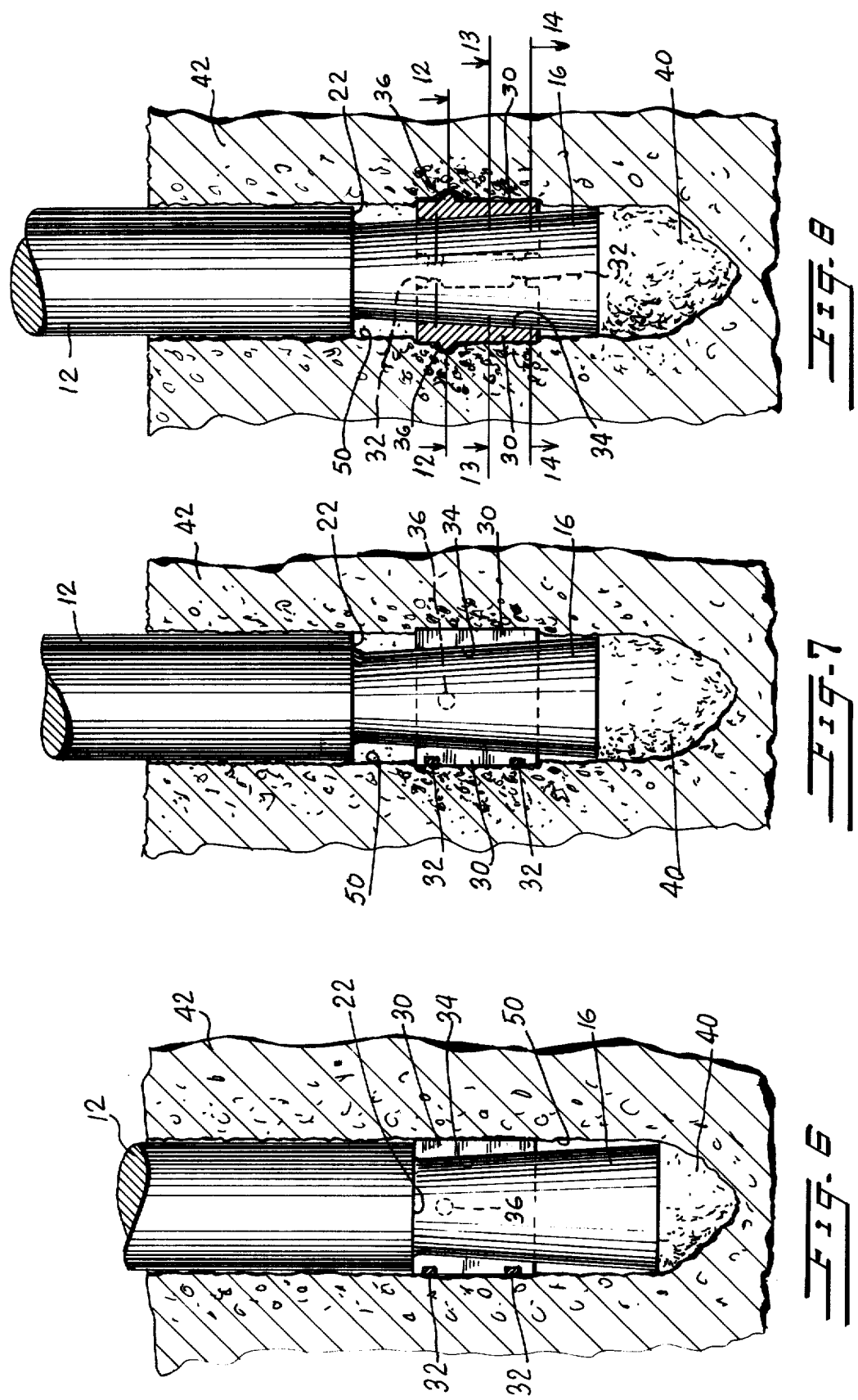

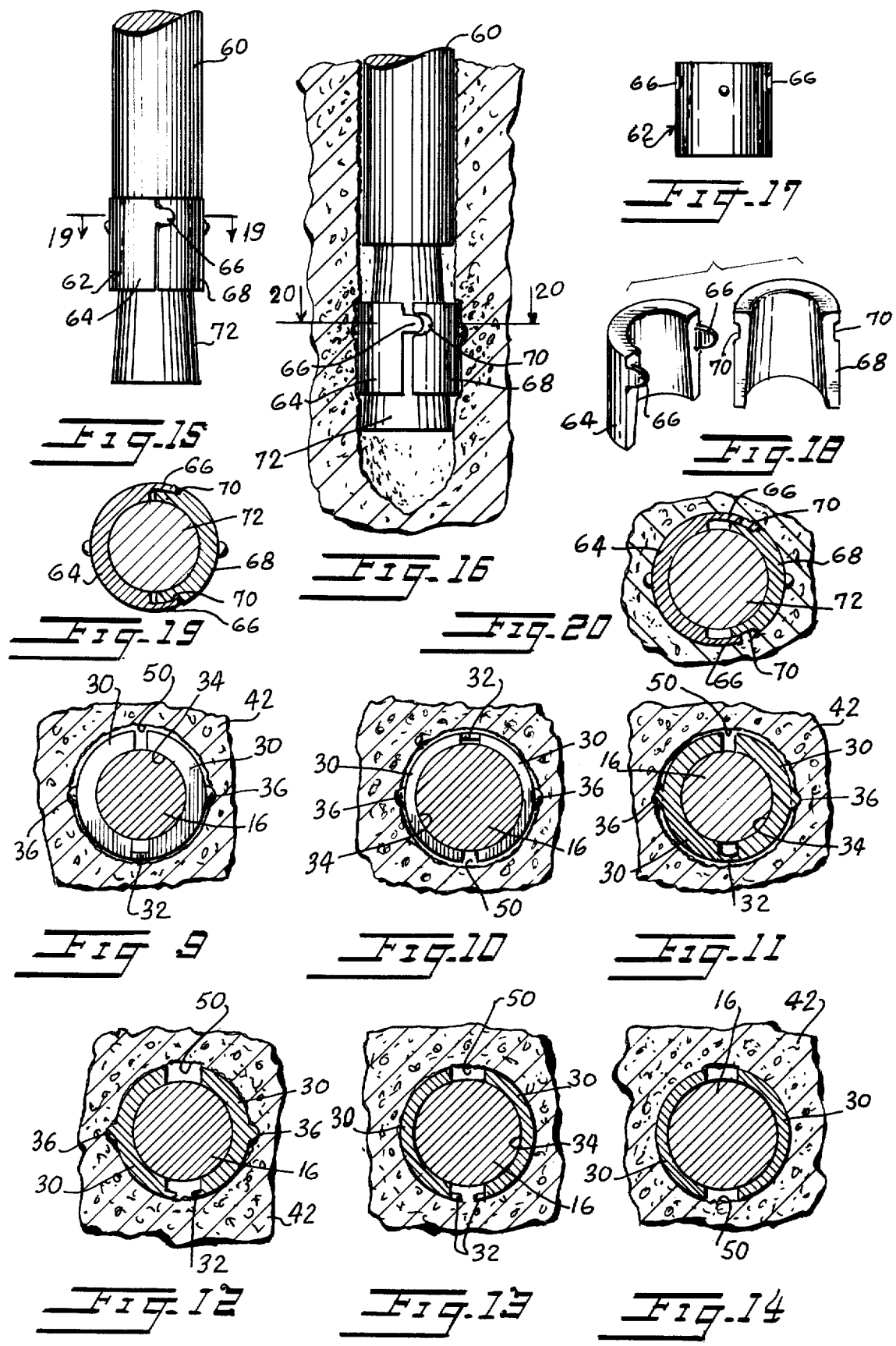

EXPANSION STUD

BACKGROUND OF THE INVENTION

1. Field of Invention

This invention relates to the use of expansion anchors in bore holes formed in concrete anchorages or the like, as for example, concrete foundation walls, reinforced concrete column supports for elevated structures, and similar installations.

2. Prior Art

The relevant prior art consists of (a) expansion bolts, such as shown in applicant's U.S. Pat. No. 3,742,809 issued on July 3, 1973, and applicant's U.S. Pat. No. 3,848,506 issued Nov. 19, 1974, and (b) expansion studs such as shown in the following patents:

| U.S. Pats. | | |
|---|---|---|
| 2,896,494 | Lerick | July 28, 1959 |
| 3,107,569 | Lerick | October 22, 1963 |
| 3,257,891 | Lerich | June 28, 1966 |
| 3,277,770 | McCulloch | October 11, 1966 |
| 3,352,193 | Lerich | November 14, 1967 |
| 3,448,651 | Passer | June 10, 1969 |
| 3,546,998 | Lerich | December 15, 1970 |
| 3,703,119 | Lerich | November 21, 1972 |
| 3,750,526 | Lerich | August 7, 1973 |
| Foreign Patents | | |
| 899,669 | Canadian | May 9, 1972 |

To the extent that applicant's own U.S. Pat. Nos. 3,742,809 and 3,848,506 provide an expansion sleeve which expands radially in perpendicular relation to the longitudinal axis of the bolt and the wall of the bore hole, these patents accomplish substantially the same result which is sought to be accomplished by the present invention. However, the means for achieving this result are different as between these issued patents and the present invention.

In the patents the tapered wedge tip of the bolt is threaded to receive an internally tapered and threaded expansion sleeve. In the present invention the tapered wedge tip of the stud is not threaded and it accomodates an internally tapered but non-threaded expansion sleeve. At their opposite end, the bolts of applicant's issued patents are headed, as bolts generally are, while the corresponding end of the stud of the present invention is threaded to receive a nut. The bolts of these patents must be rotated to expand the sleeves; in the present invention the nut is rotated for the same purpose, the stud remaining fixed in terms of angular movement.

In the second group of prior art patents, the expansion anchors are shown in the form of studs wherein neither the tapered wedge tip of the stud nor the interior tapered wall of the expansion anchor is threaded. To that extent these patents correspond to the invention of the present application.

Among these prior art patents are those wherein the expansion sleeve expands at an angle other than 90° with respect to the longitudinal axis of the stud and the wall of the bore hole. Illustrative is Passer U.S. Pat. No. 3,448,651 wherein FIG. 5 of the drawing graphically shows an angular expansion of the extension sleeve. The upper end of the expansion sleeve is wedged against the bore hole wall under less pressure than the lower end and this pressure disparity reduces the effective grip contact area of the expansion sleeve.

Other prior art patents appear to provide expansion elements which do expand in perpendicular relation to the longitudinal axis of the stud and to the wall of the bore hole. Illustrative is Lerick U.S. Pat. No. 2,896,494. However, the expansion element of Lerick are small, e.g., 90°, segments of a circumferential sleeve and neither their wedging surfaces nor the wedging surfaces of the stud are conically tapered.

Other prior art patents have different features or deficiencies which distinguish them from the present invention. For example, Lerich U.S. Pat. No. 3,352,193 has an expansion sleeve whose length corresponds, substantially, to the length of the wedge tip. Consequently, when the stud is displaced, to any appreciable extent, relative to the expansion sleeve, in order to cause expansion thereof, the lower end of the sleeve will project beyond the lower end of the wedge tip and will be unsupported thereby. The unsupported part of the expansion sleeve cannot exert a strong wedging action against the wall of the bore hole.

Lerich U.S. Pat. No. 3,546,998 shows an expansion sleeve which appears to be conically tapered both externally and internally. Even if expansion of this sleeve were considered to be perpendicular to the longitudinal axis of the stud and the wall of the bore hole, the non-cylindrical outer configuration of the sleeve would preclude uniform pressure on the bore hole wall. The larger end of the external taper would apply greater pressure and at an earlier phase of the wedging operation than the smaller end. Further, the larger end of the tapered expansion sleeve, when in unexpanded state, has a substantially larger diameter than the shank of the stud, and this would require a considerably larger bore hole than would be the case with an expansion sleeve whose diameter, prior to expansion, corresponds to the diameter of the stud shank.

SUMMARY OF THE INVENTION

The present invention provides an expansion stud having an expansion sleeve which is cylindrical in outer configuration and conically tapered in inner configuration. The diameter of the expansion sleeve, prior to expansion, corresponds substantially to the diameter of the shank of the stud. The lower end of the stud is conically tapered to form a wedge tip whose smaller end is integral with the main body of the stud shank. The conical taper of the expansion sleeve, when unexpanded, corresponds to the conical taper of the wedge tip of the stud in configuration, proportions and orientation. The length of the wedge tip substantially exceeds the length of the expansion sleeve and, prior to expansion, the expansion sleeve is mounted on the smaller, upper end of the wedge tip. Expansion of the expansion sleeve is caused when the stud is moved axially upwardly relative to the expansion sleeve. As the larger end of the wedge tip is drawn upwardly into the expansion sleeve, the expansion sleeve expands radially outwardly in perpendicular relation to the longitudinal axis of the stud and the wall of the bore hole. In the preferred form of this invention, the wedge tip is approximately twice as long as the expansion sleeve, so that expansion to the full capacity can occur while the expansion sleeve remains fully supported on the wedge tip.

The angle of the conically tapered wedge tip of the stud and conically tapered bore of the expansion sleeve is important in relation to pullout resistance. The optimum angle is 3.5°. A reasonable range both above and below this angle, such as approximately one degree in each direction, is, of course, contemplated within the scope of this invention. It is to be understood that substantially increasing the angle of the taper may substantially reduce the tensile strength of the stud at the junction between the smaller end of the wedge tip and the main body of the stud shank. A substantial increase in the taper angle may also measurably decrease the force which the interacting wedge elements would exert upon the bore hole wall. Substantially decreasing the angle of the wedge tip and expansion sleeve taper may substantially reduce the amount of expansion thereof.

The above described process of expansion requires the property of malleability in the expansion sleeve and this is provided by making the expansion sleeve of a relatively malleable material such as malleable iron or a zinc-base alloy of the type produced and sold by the New Jersey Zinc Company under the trademark ZAMAK. The result is a uniform wedging action between the entire outer cylindrical surface of the expansion sleeve and the wall of the bore hole.

DESCRIPTION OF THE DRAWING

FIG. 1 is an exploded side view of an expansion stud made in accordance with one form of this invention.

FIG. 2 is a side view showing said expansion stud inserted into a bore hole in a concrete anchorage, prior to expansion.

FIG. 3 is a view similar to that of FIG. 2, but showing the expansion stud in expanded condition.

FIG. 4 is a perspective view of the expansion sleeve of said expansion stud.

FIG. 4A is an enlarged vertical section on the line 4A—4A of FIG. 4.

FIG. 5 is a perspective view of said expansion sleeve as manufactured and prior to wrapping around the stud.

FIG. 6 is an enlarged framentary side view showing the expansion sleeve in unexpanded state and conforming to the configuration and diamensions to the upper reduced end of the wedge tip of the stud.

FIG. 7 is a view similar to that of FIG. 6 but showing the expansion sleeve in expanded form, conforming to the configuration and diamensions of a lower enlarged section of the wedge tip of the stud.

FIG. 8 is a view similar to that of FIG. 7 but showing the stud with its expansion sleeve rotated 90° from their FIG. 7 position and showing the expansion sleeve in longitudinal section.

FIG. 9 is a transverse section on the line 9—9 of FIG. 2.

FIG. 10 is a transverse section on line 10—10 of FIG. 2.

FIG. 11 is a transverse section on the line 11—11 of FIG. 2.

FIG. 12 is a transverse section on the line 12—12 of FIG. 8.

FIG. 13 is a transverse section on the line 13—13 of FIG. 8.

FIG. 14 is a transverse section on the line 14—14 of FIG. 8.

FIG. 15 is a fragmentary side view showing a modified form of the present invention.

FIG. 16 is another side view showing the modified expansion stud anchored in expanded state in a bore hole in a concrete anchorage.

FIG. 17 is a side view of the expansion sleeve of said modified form of the invention.

FIG. 18 is an exploded perspective view of said expansion sleeve.

FIG. 19 is a transverse section on the line 19—19 of FIG. 15.

FIG. 20 is a transverse section on the line 20—20 of FIG. 16.

DESCRIPTION OF PREFERRED EMBODIMENTS OF THE INVENTION

Referring now to the details of the invention as illustrated in the accompanying drawing, it will be seen that expansion stud 10 comprises a stud having a cylindrical shank 12, with a screw-threaded upper end or head 14 and a conically tapered opposite end 16 which comprises the wedge tip of the device, and an expansion sleeve 18 mounted on said wedge tip. The threaded upper end or head 14 of the stud is, of course, adapted to receive a nut 20 in screw-threaded engagement therewith. The wedge tip of the stud is oriented such that its smaller end is directed upwardly toward the main body of the stud shank, and it will be understood that said smaller upper end of the wedge tip is joined integrally with the shank. An annular shoulder 22 is formed between the wedge tip and the main body of the shank at the plane of juncture between them.

An important feature of the present invention resides in the angle of the conical taper of the wedge tip. It has been found that an angle of 3.5° is optimum, although a range extending from a point slightly below to a point slightly above said angle may be found useful and operative for different applications. As has above been indicated, a smaller angle will be instrumental in applying a greater expansive force upon the expansion sleeve, but there may be lessened resistance to total displacement of the stud from the expansion sleeve. Conversely, a wider angle than 3.5° will increase the resistance of the stud to total displacement from the expansion sleeve but at the expense of a diminished expansive force. It will also be understood that the smaller the angle the greater will be the required axial movement of the stud relative to the expansion sleeve for a given amount of expansion. Conversely, a greater angle will require a shorter axial movement of the stud relative to the expansion sleeve to attain the same degree of expansion. It has been found that a workable angular range for the wedge tip is approximately 2.5° to approximately 4.5°.

With the foregoing angular measurements in mind, it will be seen that the length of the wedge tip is largely determined by the plane at which its larger lower end attains the approximate diameter of the main body of the shank. In one embodiment of the present invention, the diameter of the main body of the shank is 0.500 inches, the diameter of the larger lower end of the wedge tip is also 0.500 inches, and the diameter of the upper smaller end of the wedge tip is 0.370–0.375 inches. In this case the optimum angle of 3.5 inches is used and the length of the wedge tip is 1.0 inch.

The expansion sleeve, in unexpanded state, complements the upper smaller end of the wedge tip in inner configuration, proportions and orientation. In outer configuration, the expansion sleeve corresponds, substantially, to the cylindrical shape and diameter of the main body of said shank. More particularly, the expansion sleeve comprises a pair of the semi-cylindrical shells 30 which are joined by means of tabs 32 and which may be cast in spread-out position, as shown in FIG. 5. FIG. 4 shows the two shells after the tabs are bent, defining a generally cylindrical configuration. Actually, each of the shells may extend an angular distance of less than 180° so that their composite configuration is that of a longitudinally split cylinder, the two shells being spaced a short distance apart. However, for the purposes of this specification and the appended claims, the expansion sleeve will be considered as the mechanical and functional equivalent of a cylinder. It should, of course, be understood that the invention herein described does not require spacing between the two shells which comprise the expansion sleeve; the shells may be held in abutment with each other or spaced from each other, whichever may be found more feasible from a manufacturing point of view.

As has been indicated, the expansion sleeve, in unexpanded state, is cylindrical in outer configuration and it is provided with an axial bore 34 which is conically tapered to the approximate configuration and dimensions of the upper smaller end of the wedge tip. More specifically, the expansion sleeve in the illustrative embodiment under discussion, has a length of approximately 0.5 inches, i.e., approximately half the length of the wedge tip. When unexpanded, the expansion sleeve is mounted on the upper half of the wedge tip, abutting the annular shoulder 22 of the stud shank. Since the optimum angle of the wedge tip taper is 3.5°, so is the angle of the bore taper 3.5°. However, any variation in the angle of taper of the wedge tip within the range above set forth, will be reflected in the angle of taper of bore 34, so that the latter will correspond, substantially, to the former.

It has been stated that the outer configuration of the expansion sleeve is substantially cylindrical. However, conventional means may be provided on the outer surface of the expansion sleeve to engage the wall of the anchorage bore hole into which the expansion stud is inserted. Such means may consist of a pair of protuberances 36, one on each of the shells, and disposed in diametrically opposite relationship. These protuberances project radially outwardly from the two shells a distance sufficient to enable them to engage the anchorage bore wall. As will be understood, the invention is not limited to the configuration, diamensions and number of protuberances 36 shown in the drawing. These protuberances are purely illustrative of conventional means of accomplishing the desired result.

With reference to FIG. 2 of the drawing, it will be seen that expansion stud 10, as above described, is inserted into a bore hole 40 formed in a concrete anchorage 42, such as a concrete wall or foundation or like mounting suited for an expansion anchor. The intended function of the expansion stud in bore hole 40 is to secure a plate or furnace member 44 to the outer surface of concrete anchorage 42. The threaded upper end or head 14 of the expansion stud projects through a hole 46 in the plate or frame member 44 to receive a washer 48 and nut 20. FIG. 2 shows the expansion stud prior to the application of sufficient torque to the nut to expand the expansion sleeve. It will further be noted in FIG. 2 that protuberances 36 engage the bore hole wall 50 even prior to expansion of the expansion sleeve.

Turning now to FIG. 3, it will be observed that sufficient torque has been applied to nut 20 to draw the stud upwardly from its FIG. 2 position. The expansion sleeve remains at substantially the same level in bore hole 40 which it is shown to occupy in FIG. 2. The reason is two-fold: in the initial upward movement of the stud, protuberances 36 engage the bore hole wall 50 and resist corresponding upward movement of the expansion sleeve. In the second phase of the operation, as soon as there is appreciable axial movement of the stud relative to the expansion sleeve, the expansion sleeve will be caused to expand and thereby grip the bore hole wall 50 to further resist upward displacement. FIG. 3 shows an advanced stage in the expansion of the expansion sleeve, wherein the two shells 30 and 32 have been forced apart to such extent as to rupture the connecting tabs 32. The expansion stud and plate or frame member 44 are now tightly secured to the concrete anchorage 42.

It will not be understood why it is necessary to make the expansion sleeve of malleable material such as malleable iron or the zinc alloy which is sold under the trademark ZAMAK. With particular reference to FIGS. 6, 7 and 8 and cross-sectional FIGS. 15-20, it will be seen that the shape of the inner tapered wall of the extension sleeve progressively changes as said expansion sleeve is forced onto the larger lower end of the wedge tip of the stud. At each transverse plane along the longitudinal diamension of the expansion sleeve, the diameter of the inner bore of said expansion sleeve increases to accommodate the larger lower end of the wedge tip. Since the expansion sleeve will be compressed between the larger lower end of the wedge tip and the wall 50 of the bore hole, it will deform to conform to the larger configuration of said lower end of the wedge tip. Compare the unexpanded configuration of the expansion sleeve as shown in FIGS. 15, 16 and 17 with the expanded configuration thereof as shown in FIGS. 18, 19 and 20.

Referring now to a second embodiment of this invention as illustrated in FIGS. 15-20, it will be observed that the stud element 60 is the same stud element which is used in the first form of the invention. The modification resides in expansion sleeve 62 which differs from expansion sleeve 18 solely in the means for joining expansion sleeve shells. As shown in FIG. 5, tabs 32 are integral with the two shells 30. FIG. 18 on the other hand shows that shell 64 is provided with a pair of lugs 66 which are integral therewith and shell 68 is provided with a pair of recesses 70 which are adapted to receive said lugs. FIGS. 15 and 19 show how lugs 66 on shell 64 engage shell 68 in recesses 70. The lugs are simply bent around shell 68 to the extent necessary to hold the two shells together in order to form the cylindrical expansion sleeve which is shown in FIGS. 15 and 19. In all other respects shells 64 and 68 correspond to shells 30 of the first form of the invention and expansion sleeve 62 corresponds to expansion sleeve 18. FIG. 15 shows that sleeve 62 is closed, unexpanded state occupies the upper half of the wedge tip 72 of stud 60. FIG. 16 shows the stud drawn axially upwardly relative to the expansion sleeve, thereby causing expansion thereof and disengagement at least in part of lugs 66 from recesses 70. See FIGS. 16 and 20.

It will be apparent from the foregoing that expansion of the expansion sleeve, whether expansion sleeve 18 or 62 or any other having the specifications above set forth, will take place in opposite radial directions perpendicular to the longitudinal axis of the stud and to the wall of the bore hole in the anchorage. There is substantially uniform pressure exerted by the wedge tip on the entire inner tapered wall of the expansion sleeve, and there is substantially uniform pressure exerted by the entire outer cylindrical wall of the expansion sleeve on the bore hole wall of the anchorage. The result is a strong anchoring action which substantially exceeds the strength of the anchorage action of contemporary and prior expansion studs as exemplified by the prior art patents first above identified.

The foregoing is illustrative of preferred forms of the present invention and it will be understood that these forms may be modified and other forms provided within the broad scope of the above specification and the appended claims.

What is claimed is:

1. An expansion stud which is adapted to be inserted into, and to expand in, a bore hole in a concrete anchorage or the like, said expansion stud comprising:
    a. a cylindrical shank,
    b. the upper end of said cylindrical shank being threaded for engagement with a nut,
    c. the lower end of said shank having a wedge tip which is conically tapered throughout its length up to said lower end of said shank, said wedge tip oriented with its smaller end directed upwardly and joined directly to the shank, its larger end directed downwardly away from the shank, and the maximum diameter of said wedge tip being substantially no greater than the diameter of said shank,
    d. an expansion sleeve mounted, when in unexpanded state, on the smaller upper end of said wedge tip,
    e. said expansion sleeve, in unexpanded state, having a conically tapered axial bore the conical angle of which is substantially the same as the conical angle of said wedge tip, and a substantially cylindrical outer configuration having a diameter which corresponds, substantially, to the diameter of the shank,
    f. whereby causing the cylindrical shank and the wedge tip to move upwardly and axially relative to the expansion sleeve causes expansion thereof in opposite radial directions perpendicular to the shank axis,
    g. the length of the wedge tip exceeding the length of the expansion sleeve approximately twice the length of the expansion sleeve,
    h. whereby, when expanded to full capacity, the expansion sleeve remains fully supported on the wedge tip.

2. An expansion stud in accordance with claim 1, wherein:
    the conical angle of the wedge tip is approximately 3.5°.

3. An expansion stud in accordance with claim 1, wherein:
    a. the expansion sleeve is longitudinally split and made of malleable material,
    b. whereby the expansion sleeve is expandable and internally conformable to the conical configuration and proportions of the larger, lower end of the wedge tip when the cylindrical shank is drawn upwardly relative to the expansion sleeve and the expansion sleeve is confined within a bore hole in a concrete anchorage or the like.

4. An expansion stud in accordance with claim 3, wherein:
    a. wall-engaging means are provided on the outer surface of the expansion sleeve,
    b. said wall-engaging means being engageable with the wall of a bore hole in a concrete anchorage or the like into which the expansion stud is inserted,
    c. whereby the expansion sleeve is fixed against movement relative to said bore hole wall when the cylindrical shank is drawn upwardly relative to the expansion sleeve to expand same.

5. An expansion stud in accordance with claim 4, wherein:
    a. the wall-engaging means comprises at least one pair of protuberances formed on the expansion sleeve,
    b. said protuberances extending radially outwardly from the expansion sleeve and disposed on opposite sides thereof.

6. An expansion stud in accordance with claim 3, wherein:
    a. the expansion sleeve comprises a pair of shells and connecting means which holds them together to the extent necessary for insertion into, and initial expansion in, a bore hole in a concrete anchorage or the like,
    b. each of said shells having a generally semi-cylindrical outer wall and a generally semi-conical inner wall,
    c. whereby said shells define, when held together by the connecting means, a sleeve of generally cylindrical external configuration, having a generally conical internal bore.

7. An expansion stud in accordance with claim 3, wherein:
    a. the connecting means which holds the expansion sleeve shells together comprises a plurality of tabs which join adjacent side edges of the shells,
    b. said tabs being each integral with both shells,
    c. the opposite side edges of said shells being free from each other.

8. An expansion stud in accordance with claim 3, wherein:
    a. the connecting means which holds the expansion sleeve shells together comprises a plurality of tabs,
    b. each tab being integral with one of said shells and overlapping the other shell,
    c. there being at least one such tab integral with each shell on opposite sides of the sleeve which the shells define.

* * * * *